Figure 1:
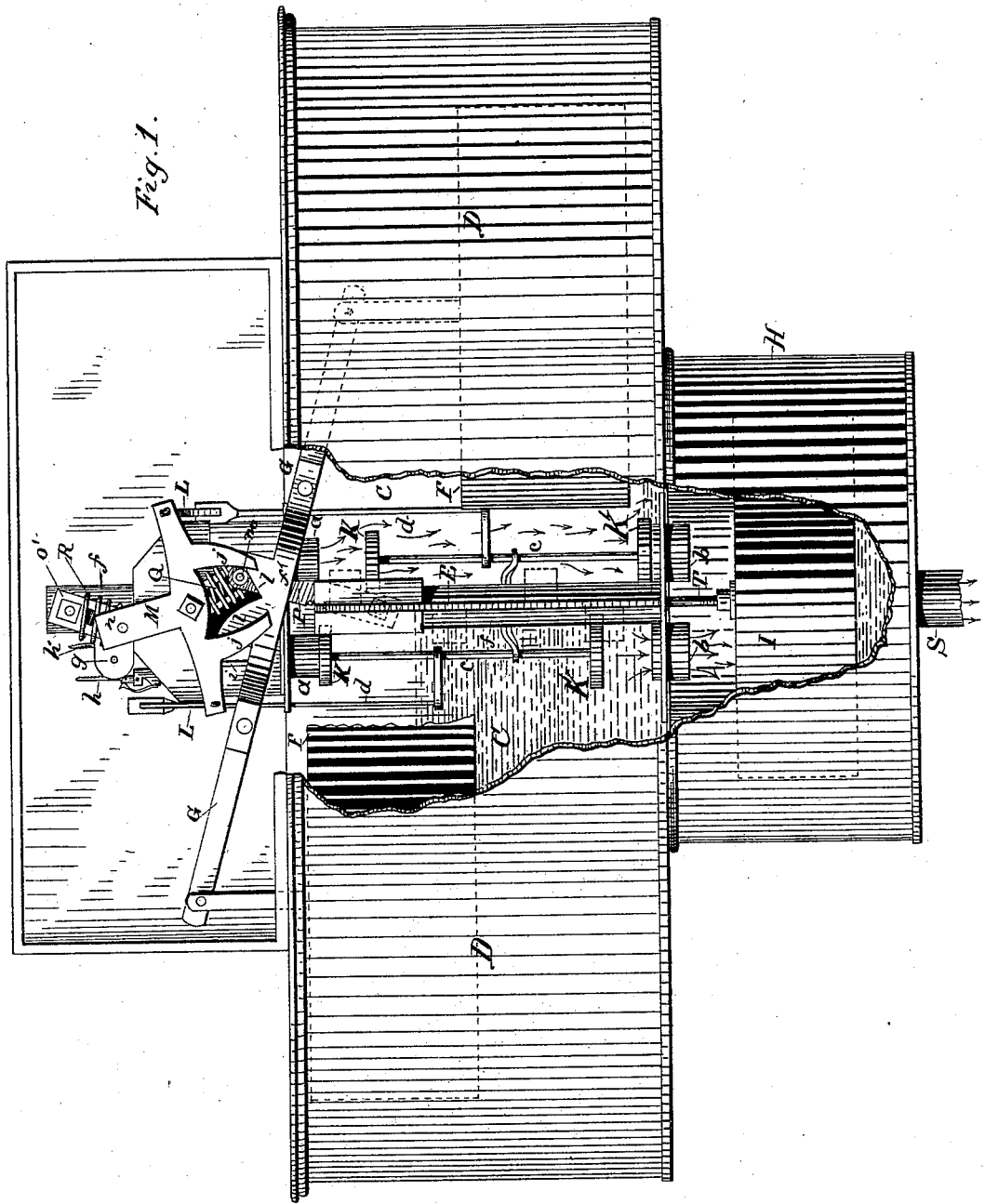

(No Model.) 3 Sheets—Sheet 1.

J. LEEDE.

THREE CHAMBERED FLOAT WATER METER.

No. 257,028. Patented Apr. 25, 1882.

WITNESSES:
Thos. Houghton.
Amos W. Hart.

INVENTOR:
J. Leede
BY
ATTORNEYS.

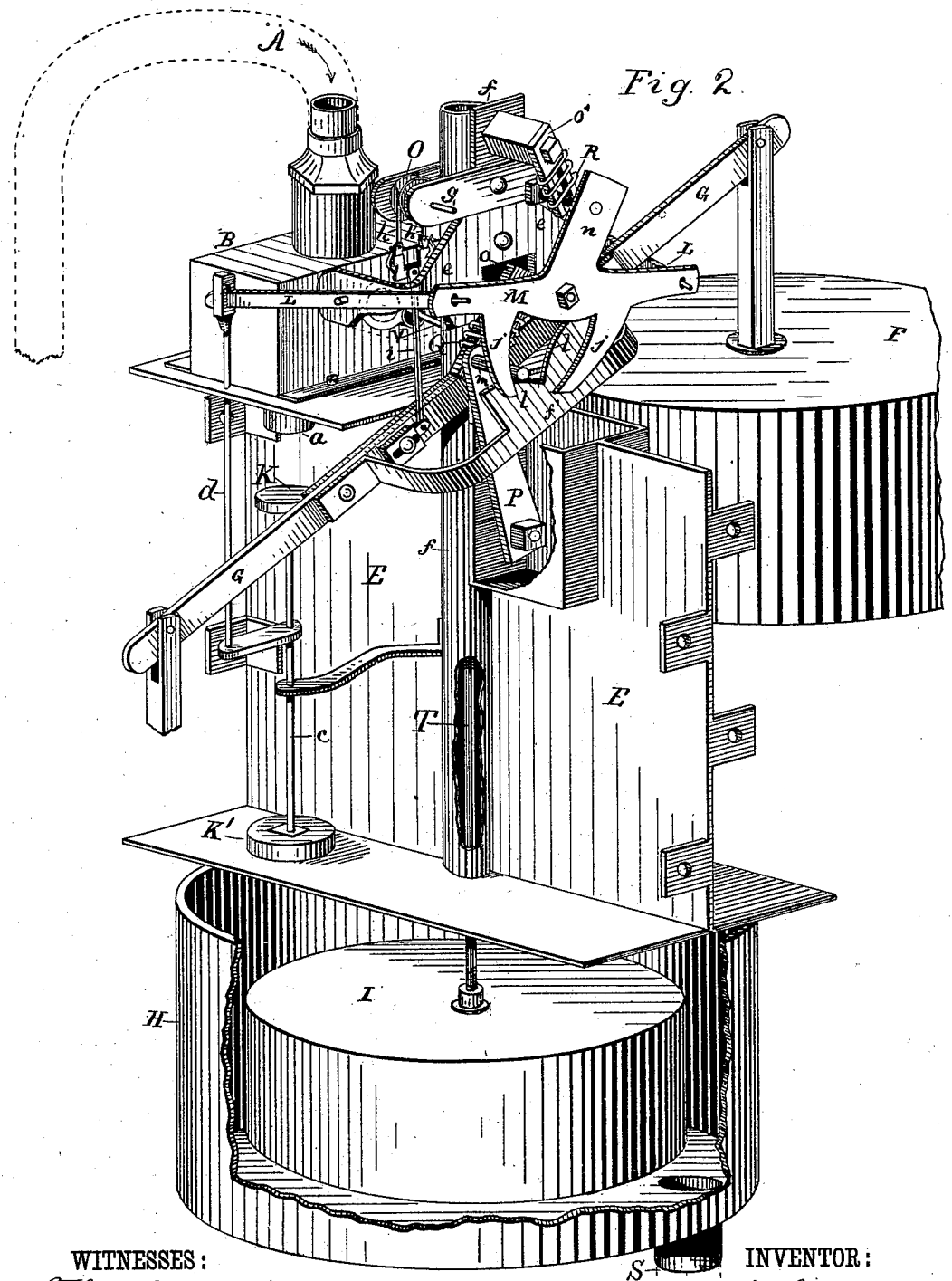

(No Model.)  3 Sheets—Sheet 3.
J. LEEDE.
THREE CHAMBERED FLOAT WATER METER.
No. 257,028.  Patented Apr. 25, 1882.
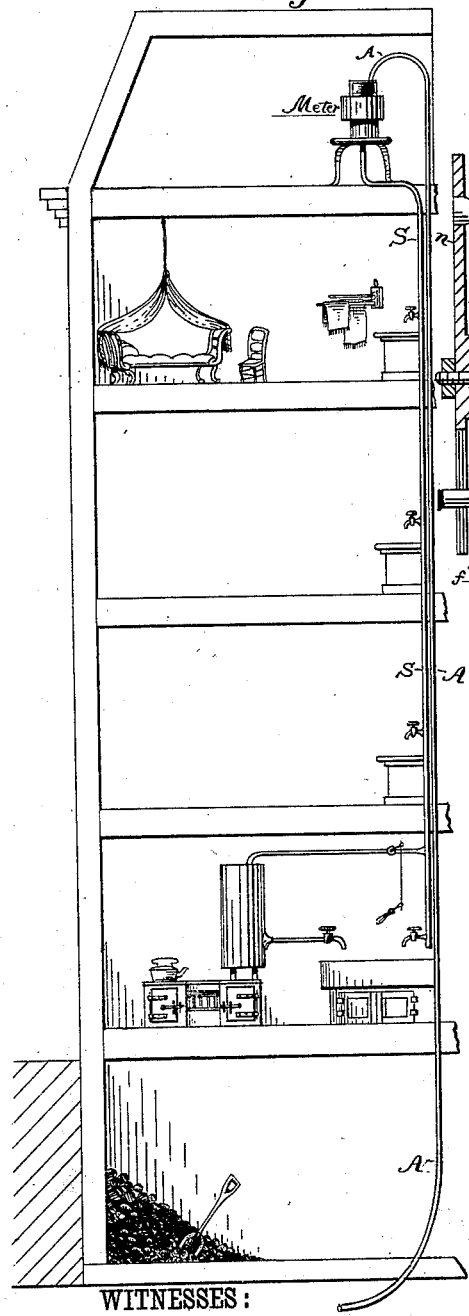
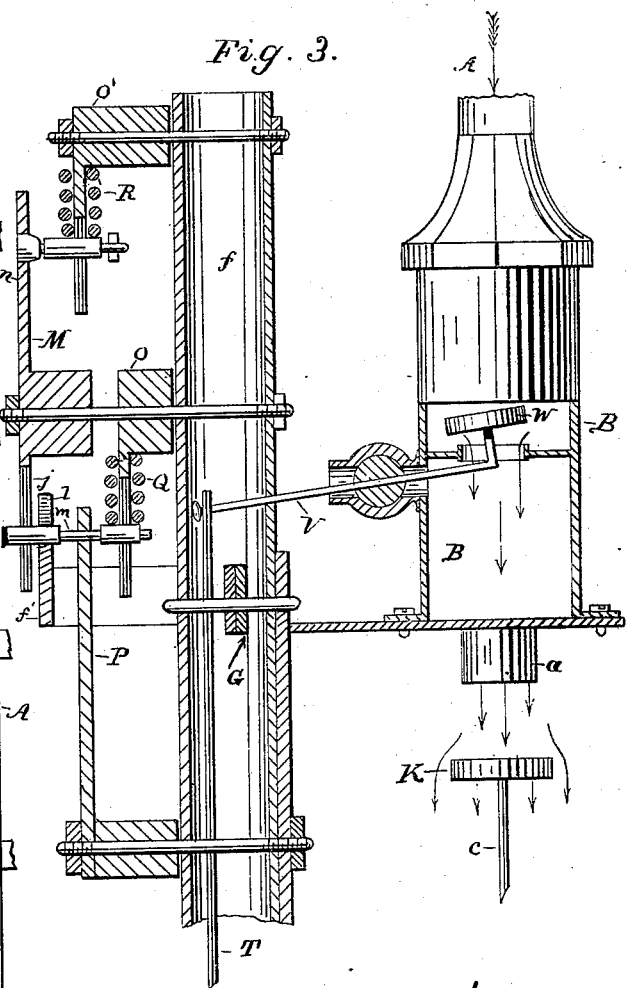
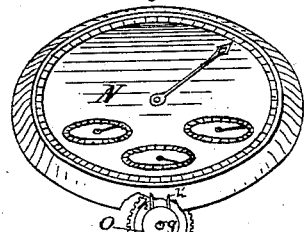
WITNESSES:
Thos Houghton.
Amos W. Hart.
INVENTOR:
J. Leede
BY
ATTORNEYS.

UNITED STATES PATENT OFFICE.

JULIUS LEEDE, OF WASHINGTON, DISTRICT OF COLUMBIA.

THREE-CHAMBERED FLOAT WATER-METER.

SPECIFICATION forming part of Letters Patent No. 257,028, dated April 25, 1882.

Application filed October 5, 1881. (No model.)

*To all whom it may concern:*

Be it known that I, JULIUS LEEDE, of Washington city, District of Columbia, have invented a new and Improved Water-Meter; and I do hereby declare that the following is a full, clear, and exact description of the same.

In previous attempts to regulate and register the distribution of water in towns and cities for use in dwellings, hotels, shops, factories, &c., wheel or piston meters have usually been employed. Besides other objections that may be urged against these, they are especially open to this, that their operation is dependent upon the head or pressure of the water flowing through them, and its velocity is therefore retarded more or less, according to the force required to operate the meter. In other words, the head or pressure in the service-pipe is reduced according to the pressure that must be applied to rotate the wheel or reciprocate the piston of the meter, as the case may be. The pressure at the spigots is hence reduced correspondingly, which is obviously objectionable in the majority of cases, and especially so in buildings whose elevation is such that the water can only be delivered into them at certain times and under favorable conditions—that is to say, when the pressure in the main and service pipe is at its maximum. In fact, the use of such a meter in such cases is for this reason impracticable. This and various other difficulties attending the use of wheel and piston meters have tended to prevent their general adoption and use.

It is the object of my invention to provide an improved meter which will operate reliably solely by the buoyancy of water at the ordinary atmospheric pressure, and therefore entirely independently of any head or pressure in the service-pipe, save such as is sufficient to merely deliver the water without reference to its rapidity of flow. The operation of the meter depends primarily upon floats that alternately rise and fall as the water flows into or out of suitable measuring receptacles or chambers containing them. The meter is in practice placed either above or at the highest point in the building where water is required to be distributed, and the service or supply pipe is carried directly up to it, with few or no sharp bends or angles, in order to avoid as far as possible any obstruction to the flow of water up to such point, whence it is distributed over the building. The supply or service pipe is throttled by a valve, whose action depends upon a float contained in a chamber located below the aforesaid meter or measuring chambers. The said float and valve thus constitute an automatic governor that controls the supply of water to the meter, and also indirectly the discharge therefrom, and likewise prevents "flooding" of the measuring-chambers, besides regulating the action of the registering mechanism, as hereinafter set forth.

My invention further includes various other novel and important features and devices, which will be fully described hereinafter, the object of which is to produce a reliable operation and accurate register with a minimum friction and expenditure of force.

In accompanying drawings, forming part of this specification, Figure 1 is a front view of my improved meter, a portion being broken away to show the interior construction. Fig. 2 is a perspective view of the working or movable parts of the meter removed from the body of the casing which in practice incloses them. Fig. 3 is a vertical central section of the upper portion of the meter, showing the governor-valve and its connections and valve shifting and holding mechanism. Fig. 4 is a detail front view, showing the arrangement of the dial-register and pawl-and-ratchet mechanism connected therewith. Fig. 5 is a view in the nature of a diagram, illustrating the arrangement of the meter and service and discharge pipes in a dwelling.

I will first indicate the location and connection of some of the main parts of the meter.

The letter A indicates the service or supply pipe, which in practice extends to and connects with the street-main; B, a primary distributing-chamber, and C C measuring or meter chambers, into which water is allowed to flow from said distributing-chamber. These meter-chambers are in this instance formed by dividing the body or main portion D of the meter-casing by means of a vertical transverse partition, E, which also serves as a support or guide for all the movable parts of the meter, save the floats. Each meter-cylinder C contains a float, F, which is attached to an oscillating lever, G, that operates valve and registering mechanisms, as hereinafter described.

Below the casing D, and attached to it, is a cylinder, H, which contains a float, I, whose action controls the induction of water from service-pipe A into chamber B by means of a valve, W, located in the latter, Fig. 3. The water passes from distributing-chamber B into either of the meter-chambers C while the contents of said chambers are discharging into governor-cylinder H, whence the water is drawn off through the distributing-pipe S as required for use. (See Fig. 5.)

I will now enter upon a detailed description.

The distributing-chamber B is provided with two outlets or discharge-openings, $a$ $a$, in its inner side, one on each side of partition E, and the discharge therefrom always alternates, being first into one meter-chamber C and then the other. The means which directly cause this alternation are lifting disk-valves K. These may be constructed of various materials; but I prefer caoutchouc. Said valves seat upward against pendent tubes or annular rims, and are attached to axial stems $c$, having similar valves, K', on their lower ends, that seat downward on annular rims, surrounding outlet-openings $b$ in the bottom of the meter-chambers C. The valve-stems $c$ work vertically in fixed guides, and have lateral parallel branches or arms $d$, that extend upward, and are provided with slotted heads to adapt them for connection with horizontal levers L of the first class, which are pivoted to lateral arms $e$ $e$ of a tubular standard, $f$, forming part of partition E. The float-lever G acts on a tappet-lever, M, which in turn vibrates these valve-levers L, and thus indirectly operates the valves themselves. The valve and stems $c$ are of less length than the distance between the distributing-chamber B and the bottoms of the meter-chambers C, so that when one upper or induction valve, K, is seated the lower or eduction valve, K', on the same stem is raised from its seat, and vice versa. The two sets of valves (there being one set, K K', for each meter-chamber C) are thus caused to act simultaneously, but in opposite directions, so that when one of the upper valves, K, is seated the corresponding one, K', on the other side of partition E is unseated, and similarly of the lower valves, K', as illustrated in Figs. 1 and 2. The aforesaid float-lever G is oscillated by alternating rise and fall of the floats F F in the meter-chambers C C, and by its oscillations operates registering mechanism N, Fig. 4, consisting of a suitably-inscribed dial having index-hands operated by a train of suitable gearing. Such gearing is put in action by direct connection with the shaft $g$, Figs. 2, 4, on which is fixed a ratchet-wheel, O, that is rotated by push and pull pawls $h$ $h'$, connected by a pivoted stem, $i$, with the float-lever G, by means of a block or plate that is slotted lengthwise, to adapt it for adjustment for the purpose of regulating the action of the floats and levers on the registering mechanism as required for accurate operation of the meter as a whole. As the sway-lever G oscillates the pawls $h$ $h'$ are necessarily reciprocated vertically, and, being held on the ratchet O by means of springs, they alternately engage with and thus impart constant rotation to it.

The T-shaped tappet-lever M is provided with arms $j$, which extend downward and curve slightly inward. A rocking arm, P, is pivoted at its lower end within a box formed in the upper portion of partition E, and has on its upper end a laterally-projecting stud, $m$, carrying a friction-roller. The float-lever G is pivoted to the tube $f$, Fig. 3, and has a longitudinal brace, $f'$, attached at points equidistant from the fulcrum. Said brace is constructed with cams $l$ at the middle of its length, which incline upward and outward from a common point of separation. The stud $m$ of said arm works in contact with such cams $l$. A coiled or spiral spring, Q, is employed to throw the arm P quickly over to the extreme limit of its lateral movement in either direction, and thus cause it to throw the tappet-lever M into either of the positions required for quickly operating the valve-levers L L and valves K K', and holding the latter firmly on their seats. A second spring, R, is arranged above the tappet-lever M, so as to act on the vertical arm $n$ of the latter. The said springs encircle pivoted bars $o$ $o'$, which are provided with a lengthwise slot to receive and allow the requisite play of studs on the rocking arm P and lever M, respectively.

The functions of the two springs are in the main distinct. Thus the lower spring, Q, causes the arm P to act as a wiper by striking tappet-lever M, thereby changing its position so as to operate the valves K K' at the required time. The upper spring, R, acts on the tappet-lever directly, and its effect is to hold the latter firmly in one of its positions (indicated in Figs. 1 and 2) until the wiper P acts in the opposite direction.

The operation of the meter so far as described in detail has been already mainly indicated, but it may be recapitulated thus: The water discharges from service-pipe A into distributing-chamber B. In Fig. 1 the valves K and K' in the right-hand meter-chamber C are shown down. Consequently the water will be allowed free entrance into such meter-chamber, and will gradually buoy or raise the float F therein, which will have the effect of gradually tilting lever G from the position shown in Fig. 1 into the reversed diagonal position shown in Fig. 2. The wiper P will throw the tappet-lever M into the oppositely-inclined position, Fig. 2, and spring R will hold it in such position. Such movement of the tappet-lever operates the levers L L, with which it is loosely connected, and thereby shifts the two sets of valves K K', one set up and the other down, so that the water discharges from distributing-chamber B into the left-hand meter-chamber C, whose exit is simultaneously closed, while exit of the right-hand chamber C is opened to allow the water accumulated therein to have free and rapid discharge into the governor-cylinder H, whence it passes without obstruction into the pipe S, Figs. 1, 5, and from which it is drawn off at different spigots as required for use.

In another invention in this line I have employed two governors—one for the induction and another for the eduction; but in this instance I have contrived to combine their functions in a single governor, whose construction, arrangement, and operation I will now describe with the necessary particularity.

As before stated, the governor consists of a cylinder, H, containing a float, I, that operates a valve in the distributing-chamber B. Said float has a vertical stem, T, which passes up through the tube $f$, and is connected with a horizontal lever, V, of the first class, Fig. 3, whose opposite end has a valve, W, attached, that seats downward in the distributing-chamber B and opens or closes the inlet, according as the float I rises or falls. The said lever V is pivoted in the side of box B, and its joint suitably packed to prevent leakage from the latter. It is obvious that if the quantity of water being drawn off at the spigots at any time equals the quantity flowing into the meter the governor-float I will not rise, since no water can accumulate in the cylinder H; but in case the supply at any time exceeds the quantity being drawn off for use, then there will be such accumulation in the governor-cylinder, thus buoying and raising the float I, tilting the lever V, and bringing the valve W down on its seat, in which position it cuts off supply to the meter and arrests its action altogether. The water is delivered from the service-pipe into chambers C, (under such pressure as may exist in the main,) and escapes from said chambers and passes through the governor-cylinder H by the effect of gravity. The outlets $b$ of the meter-chambers C and governor-cylinder H are therefore made considerably larger than those, $a$, of the distributing-chamber B, so that the quantity of water may escape from the chambers C with as great rapidity as it enters them.

It will be seen that the location or arrangement of the parts constituting the governor is very important. Thus, if the cylinder H and float I were located contiguous to the valve W—that is to say, if the governor devices were placed above the measuring-chambers C C, instead of below them, as shown, so that the water would flow through said cylinder before entering the measuring-chambers—then it is evident the supply could not be arrested promptly upon cutting off discharge at the spigots, since the water must first accumulate in the measuring-chambers sufficiently to back into the governor-cylinder before the float I could rise. In other words, the measuring-chambers, one or both, would be flooded before the governor could be affected so as to throttle the supply, and water thus in excess of the usual quantity cannot be measured, since the measuring-chambers and floats are relatively proportioned or gaged, so that a definite quantity of water— say a gallon—in a chamber will raise a float high enough to tilt the sway-lever, and more than this quantity could have no other or further effect, and must be drawn off before the sway-lever can begin to tilt and operate the registering mechanism. In brief, with the governor located above the measuring-chambers, one or both of the latter would be flooded every time the discharge at the spigots is arrested, and since this excess must flow off before the sway-lever can begin to tilt, none but a grossly inaccurate measurement can be obtained, whereas by placing one element—that is to say, the float and cylinder—below the measuring-chamber, the stoppage of the flow into and from the distributing-pipe S quickly causes the slight accumulation in the cylinder necessary to raise the float and shut the valve W, and thus cut off supply to the measuring-chamber almost simultaneously with the discharge from the meter, thus preventing flooding and insuring accuracy of measurement.

It will be further observed that when the discharge is arrested at a spigot the accumulation of water in the governor-cylinder will instantly cause the float I to rise and cut off, or begin to cut off, the supply to the measuring-cylinders C C; and since the oscillation of the floats F is arrested by such stoppage of the supply the registering mechanism also ceases to operate coincidently with the rise of said governor-float; and, conversely, the opening of a spigot instantly affects the governor, so that water is allowed to at once recommence flowing through the meter and the registering mechanism to also begin acting simultaneously. In this my meter is advantageously distinguished from others of its class in which tilting measuring-chambers are employed.

What I claim as new is—

1. The combination of registering mechanism, a primary distributing-chamber, and stationary measuring-chambers, which constitute the body of the meter, and are provided with valves for controlling discharge therefrom, and an automatic governor, all arranged as shown and described, whereby when a spigot is opened the governor instantly acts to allow water to flow uninterruptedly or in a continuous stream from the distributing-chamber, through one or the other measuring-chamber and through the governor-cylinder, into the distributing-pipe, and when the spigot is closed the said governor instantly acts to cut off the stream thus passing through the meter and simultaneously arrest the registering mechanism, as specified.

2. The combination, with registering mechanism, the stationary measuring-chambers having valves for controlling the discharge therefrom, and oscillating floats for operating said mechanism, of the automatic governor whose float and cylinder are placed beneath and its valve above the measuring-chamber, so that said governor will instantly begin to allow discharge or to cut it off, and simultaneously allow or arrest the action of the registering mechanism, as specified.

3. The combination, with measuring-chambers and registering mechanism connected therewith, of valves which are connected in pairs and located within the measuring-chambers and operate automatically to alternately allow and cut off both the supply to and discharge from said chambers, substantially as specified.

4. The combination, with the measuring-chambers, floats, and sway-lever G, of levers L L, connected with and operated by the latter, and the valves K for regulating the induction of the said chambers, substantially as shown and described.

5. The combination, with the measuring-chambers, floats, and sway-lever G, of levers L, and the two sets or pairs of valves K K', one set being arranged in each chamber, to operate as specified, for allowing one of said chambers to be supplied while the other is discharging, as specified.

6. The combination, with the measuring-chambers, floats, and sway-lever G, of levers L L, connected therewith, the valves K K', for regulating the induction and eduction of said chambers, and the automatic governor consisting of cylinder H, float I, valve W, and connecting-rod T, all arranged to operate substantially as shown and described.

J. LEEDE.

Witnesses:
AMOS W. HART,
SOLON C. KEMON.